(12) United States Patent
Nishimiya (10) Patent No.: US 10,688,567 B2
(45) Date of Patent: Jun. 23, 2020

(54) RETRACTING CHUCK

(71) Applicant: KITAGAWA IRON WORKS CO., LTD, Hiroshima (JP)

(72) Inventor: Tamio Nishimiya, Hiroshima (JP)

(73) Assignee: KITAGAWA IRON WORKS CO., LTD (JP)

(*) Notice: Subject to any disclaimer, the term of this patent is extended or adjusted under 35 U.S.C. 154(b) by 79 days.

(21) Appl. No.: 16/074,490

(22) PCT Filed: Jan. 17, 2017

(86) PCT No.: PCT/JP2017/001333
§ 371 (c)(1),
(2) Date: Aug. 1, 2018

(87) PCT Pub. No.: WO2017/138307
PCT Pub. Date: Aug. 17, 2017

(65) Prior Publication Data
US 2019/0030617 A1    Jan. 31, 2019

(30) Foreign Application Priority Data
Feb. 8, 2016    (JP) .................................. 2016-022018

(51) Int. Cl.
*B23B 31/177* (2006.01)
*B23B 31/16* (2006.01)

(52) U.S. Cl.
CPC ........ *B23B 31/16266* (2013.01); *B23B 31/16* (2013.01); *B23B 31/16258* (2013.01); *B23B 2260/116* (2013.01); *B23B 2260/136* (2013.01)

(58) Field of Classification Search
CPC ........ B23B 31/16266; B23B 31/16258; B23B 31/16; B23B 2260/136; B23B 2260/116;
(Continued)

(56) References Cited

U.S. PATENT DOCUMENTS 2,821,400 A * 1/1958 Hohwart ................. B23B 31/32
                                                                279/139
2,991,084 A * 7/1961 Garrison ................. B23B 31/32
                                                                279/2.05
(Continued)

FOREIGN PATENT DOCUMENTS

CH        383118 A  * 10/1964    ............. B32B 31/32
DE      1109486 B   *  6/1961    ............. B32B 31/32
(Continued)

OTHER PUBLICATIONS

International Search Report dated Apr. 11, 2017 issued in International Application No. PCT/JP2017/001333.

*Primary Examiner* — Sunil K Singh
*Assistant Examiner* — Paul M Janeski
(74) *Attorney, Agent, or Firm* — Merek, Blackmon & Voorhees, LLC (57) ABSTRACT

Provided is a retracting chuck that does not rattle even though a moving body can be operated axially, and that enables turning in which the grasp accuracy is increased and vibration and chatter are inhibited. The retracting chuck (100) is provided with: a body (1) comprising a rear body (2) disposed on the axial rear side and a moving body (3) disposed on the axial front side; a plunger (8) moving axially in the body (1); and a master jaw (6) which engages with the plunger (8) and which is caused by a wedge action to move in the radial direction by a slot (3*a*) formed in the moving body (3). The moving body (3) moves axially relative to the rear body (2). In the rear of body (2), a plate spring (11) is disposed in a bridging manner between seats (2*a*) provided at a distance from each other, and the plate spring (11) is fastened by a bolt (13) to each of the seats (2*a*). Between the seats (2*a*), the plate spring (11) is fastened by a bolt (16) to a seat (3*b*) of the moving body (3).

7 Claims, 8 Drawing Sheets

(58) Field of Classification Search
CPC . B23B 2250/16; B23B 2231/34; B23B 31/19;
B23B 31/102; Y10T 279/18; Y10T
279/31; Y10T 279/1233
See application file for complete search history.

(56) References Cited

U.S. PATENT DOCUMENTS

| | | |
|---|---|---|
| 3,460,849 A | 8/1969 | Highberg |
| 2004/0169342 A1 | 9/2004 | Nishimiya et al. |

FOREIGN PATENT DOCUMENTS

| | | |
|---|---|---|
| JP | 2003-1507 | 1/2003 |
| JP | 2015-58529 | 3/2015 |

\* cited by examiner

RETRACTING CHUCK

TECHNICAL FIELD

The present invention relates to a chuck used for a machine tool, and in particular, preferred embodiments of the present invention relate to a chuck having a retracting function.

BACKGROUND ART

In grasping a workpiece by using a retracting chuck, jaws are firstly brought close to the workpiece in a radial direction, and grasp the workpiece loosely. Then, the jaws are moved axially within a limited range. During this period, the workpiece is surely seated on a closed contact seat. Then, the workpiece is eventually grasped by moving the jaws in the radial direction. The reason for grasping the workpiece loosely is to closely adhere the workpiece on the closed contact seat by abutting even if the workpiece is inclined.

A body is divided into a moving body and a rear body which are fixed on a spindle through a back plate. The moving body is movable axially relative to the rear body by a plunger and a guide portion of the rear body. The jaws are provided to the moving body side. The rear body and the moving body are connected by a spring. The spring is deflected by cylinder thrust applied on the plunger after the jaws contact the workpiece. According to this, the moving body is drawn axially, and the workpiece is loosely grasped with a cushion property of the spring. In the case of grasping the workpiece finally, the moving body is further drawn in. For example, patent literature 1 and patent literature 2 disclose retracting chucks thus constituted, respectively.

RELATED ART DOCUMENTS

Patent Documents

Patent literature 1: U.S. Pat. No. 3460849
Patent literature 2: Japanese Unexamined Patent Application Publication No. 2003-1507

SUMMARY OF THE INVENTION

Object to be Solved by Preferred Forms of the Invention

In known retracting chucks, a rear body is fixed on a spindle of a machine tool, while a moving body is in a state of floating from the rear body by being supported by a spring. The moving body is guided by a plunger and a guide member of the rear body so as to be operable in an axial direction of a rotation axis which the chuck is rotated and so as to be inoperable in a radial direction and a rotational direction. However, a fine space is required to operate the rear body in the axial direction, thereby generating rattling on the moving body. This rattling makes unstable the position of the body, thereby exerting a bad influence on grasp accuracy.

The problem to be solved is to provide a retracting chuck that does not rattle even though the moving body can be operated in the axial direction, and that enables turning in which the grasp accuracy is increased and vibration and chatter are inhibited.

Means of Solving the Problems

The retracting chuck is provided with a body including a rear body disposed on the axial rear side and a moving body disposed on the axial front side, a plunger moving axially in the body, and master jaws moving in a radial direction which are guided by the moving body due to movement of the plunger. The moving body moves axially relative to the rear body. In the rear body, a plate spring is disposed in a bridging manner between the first seats provided at a distance from each other, and the plate spring is fastened by the first bolts to each of the seats. In the moving body, the plate spring is fastened by the second bolts to the second seats provided to the back face of the moving body between the first seats.

Effects on the Invention

In the present invention, the moving body is supported by the plate spring whose thickness is unaffected to the rear body in a rotational direction or radial direction of a rotational axis C and which causes little displacement even though the moving body is a retracting chuck movable axially. Accordingly, even though the axial direction is displaced, other directions are fixed with high rigidity, and therefore, the moving body does not rattle to enable machining with a high accuracy. In addition, the body rigidity is sufficiently secured, thereby causing no chatters and no vibrations in machining. Besides, the moving body does not rattle because it is indirectly bolted on a spindle.

BRIEF DESCRIPTION OF THE DRAWINGS

FIGS. 1A and 1B show a chuck according to Example 1, FIG. A is a perspective view

FIGS. 3A and 3B show a plunger, master jaws and jaws.

FIGS. 4A and 4B show a moving body, master jaws, jaws, face-blocks and a jig, and FIG. 4A is a perspective view.

FIGS. 5A to 5C show a state that a workpiece is grasped.

FIGS. 6A and 6B show a cross-sectional view taken on line X-X in FIG. 1A.

FIGS. 7A to 7C show schematically displacement of a plate spring.

FIGS. 8A to 8D show a chuck in Example 3.

PREFERRED MODE FOR CARRYING OUT THE INVENTION

Example 1

Figure 1A:
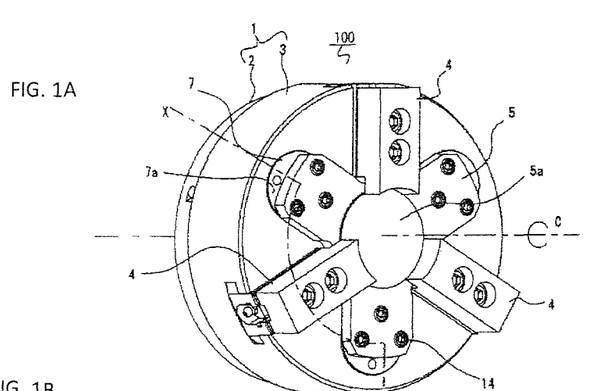
Figure 1B:
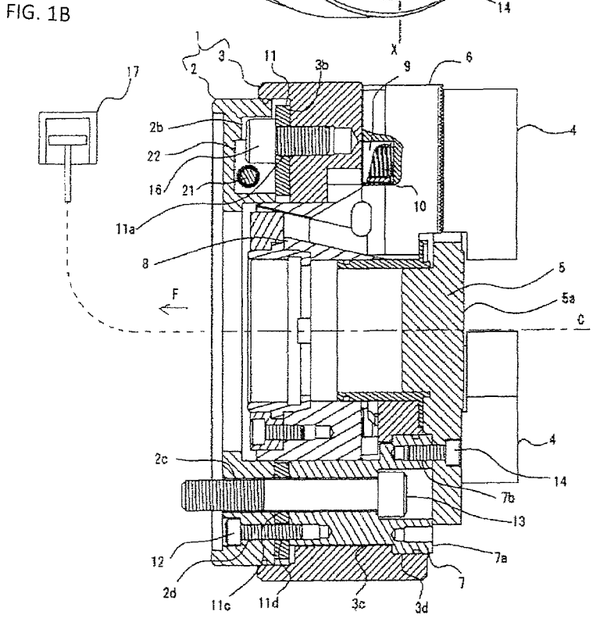
FIG. 1B is a cross-sectional view.

FIG. 1 shows a chuck 100 having three jaws 4 of Example 1, FIG. 1A is a perspective view, and FIG. 1B is a cross-sectional view. The chuck 100 is provided with three jaws 4 moving in a radial direction on a front side face (to the right in FIG. 1A) of a body 1. Besides, a jig 5 is fitted on the front side face of the body 1, and a center of the jig 5 is formed into a closed contact seat 5a on which a workpiece is abutted. The body 1 includes a rear body 2 and a cylindrical moving body 3. The rear body 2 is rotated around a rotation axis C of the chuck 100 by a spindle of a machine tool. The rear body 3 is movable in an axial direction (which is called a Z direction as follows) of the rotational axis C to the rear body 2.

A plunger 8 is inserted in the body 1 so as to move in the Z direction, and master jaws 6 are connected to the moving body 3 so as to slide in slots 3a extending in the radial direction, and the plunger 8 and the master jaws 6 are engaged so as to create a wedge action. A plate spring 11 is provided between the rear body 2 and the moving body 3. The fixation of both is detailed later. Three face-blocks 7 of the same number as the jaws 4 are fastened to the rear body 2 by bolts 13 (the first bolts) through the plate spring 11. The face-blocks 7 penetrate the moving body 3 and project at positions held between the jaws 4. The projecting surfaces of face-blocks 7 are reference faces 7a, each serving as a reference on machining, perpendicular to the Z direction. Each reference face 7a has a plurality of bolt holes 7b for fitting the jig 5. The jig 5 is fixed on the reference faces 7a of the face-blocks 7 by bolts 14.

Figure 2:
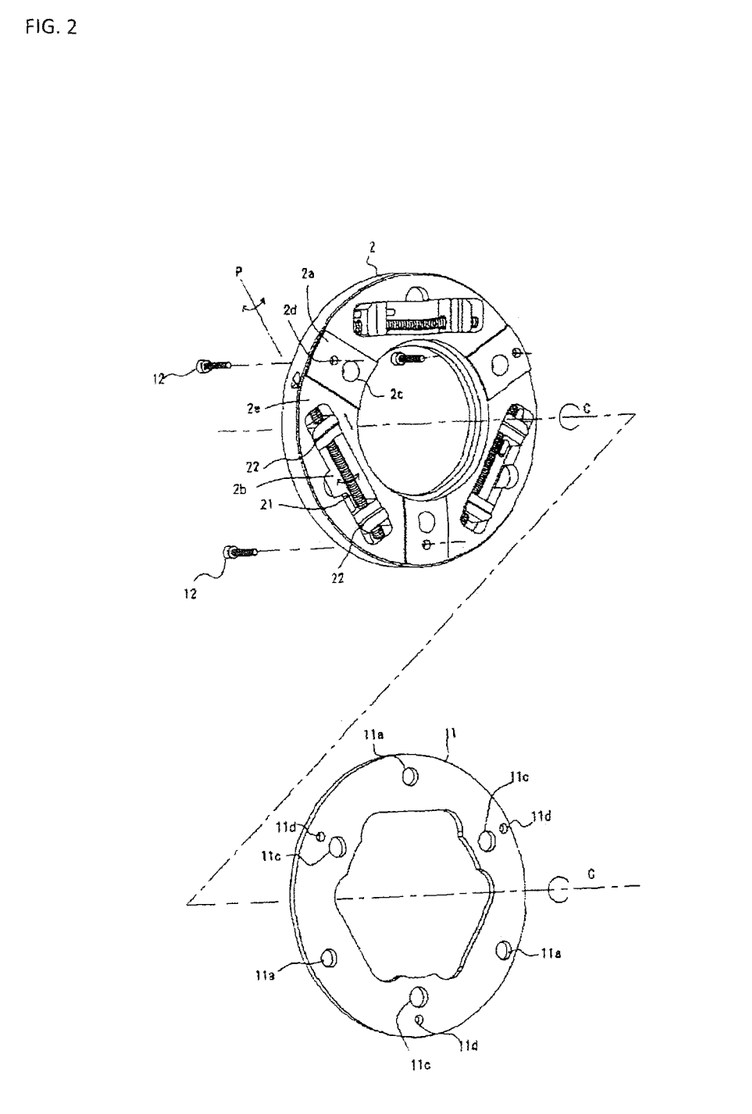
FIG. 2 is a perspective view of a rear body and a plate spring.

FIG. 2 is a perspective view of the rear body 2 and the plate spring 11. The rear body 2 is formed in a ring shape, and has seats (the first seats) 2a for fitting the plate spring 11 at equal angular intervals. Each of the seats 2a has large and small through holes 2c, 2d, respectively. The through holes 2d are used to fix the face-blocks 7 on the seats 2a. Each concave portion 2e between the adjacent seats 2a recesses towards the rear side (to the left in FIG. 2), and forms a space, which allows the plate spring 11 disposed in a bridging manner thereon to be deformed, with the moving body 3. A groove 2b is provided at the center of each concave portion 2e. A screw rod 21 is disposed in the groove 2b in its length direction. The screw rod 21 has screw directions changed in the middle, one side is formed in a right screw and the other side is formed in a left screw. The screw rod 21 is rotated from the outer-periphery side P of the rear body 2. Sliders 22 are screwed on to both sides of the screw rod 21, and brought close or separated from each other by rotating the screw rod 21. In the chuck 100, the groove 2b is positioned to the rear of each jaw 4, and the seats 2a are positioned to the rear of the face-blocks 7.

The plate spring 11 has a ring shape, and three sets of two through holes 11c, 11d spaced at equal angular intervals. Each larger through hole 11c is aligned in a radial direction with a corresponding smaller through hole 11d. Further, through holes 11a are disposed therebetween at equal angular intervals. The through holes 11c, 11d correspond to the through holes 2c, 2d, respectively. The through holes 11a are used to fix the moving body 3 on the plate spring 11.

Figure 3A:
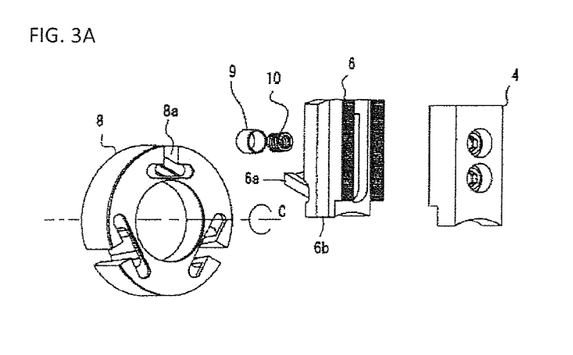
FIG. 3A is a perspective view.
Figure 3B:
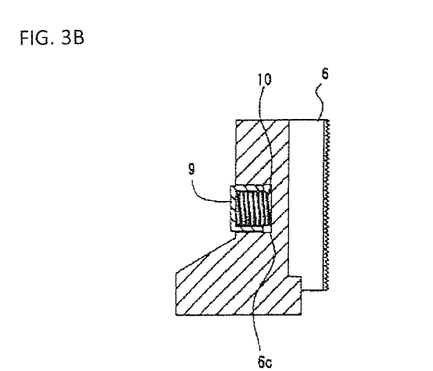
FIG. 3B is a cross-sectional view of a master jaw 6.

FIGS. 3A and 3B shows a plunger 8, master jaws 6 and jaws 4, and FIG. 3A is a perspective view and FIG. 3B is a cross section view of a master jaw 6. The plunger 8 and the master jaws 6 have wedge members 6a of three master jaws 6 engaging corresponding wedge portions 8a formed in three places in the plunger 8 one by one. Each wedge portion 8a has an inverted T-groove, and is inclined so as to separate from an axial center of the rotational axis C towards the rear side (to the left in FIG. 3A). Each wedge member 6a of the master jaw 6 enters the corresponding wedge portion 8a and slides therein. On the other hand, jaw carriers 6b provided on both sides of the master jaw 6 slide in the radial direction in slot 3a formed in the moving body 3 and extending in the radial direction. When the plunger 8 is retracted rearward relative to the moving body 3, each master jaw 6 moves in the radial direction while being restricted from movement other than radial movement by the moving body 3 and by being guided by the slot 3a, through wedge action. The jaws 4 are fixed on the master jaws 6 in a one to one relationship (i.e., one jaw 4 is fixed to one master jaw 6) and jaws 4 grasp a workpiece.

A non-through hole 6c is drilled or otherwise formed in the rear of the master jaw 6. A container 9 in which a spring 10 is accommodated is stored in the non-through hole 6c. The spring 10 develops its energizing force pushing the master jaw 6 forward (to the right in FIG. 3B) in the slot 3a, and the jaw carriers 6b at both sides of the master jaw 6 are pressed on the front-side wall surface of the slot 3a. The gravity acting on each master jaw 6 is made different (i.e., varied) in response to the rotational angular position of the chuck 100 under a static state. On the other hand, there is a sliding clearance between the master jaw 6 and the slot 3a. If springs 10 were omitted, the master jaws 6 would receive gravitational forces in different directions from each other relative to the chuck center, respectively, and then, each of the master jaws 6 could fall down in the direction of gravity in the sliding clearance. The spring 10 prevents the master jaws 6 from falling down by pressing them to the slot 3a at a time before the jaws 4 keep the workpiece.

Figure 4A:
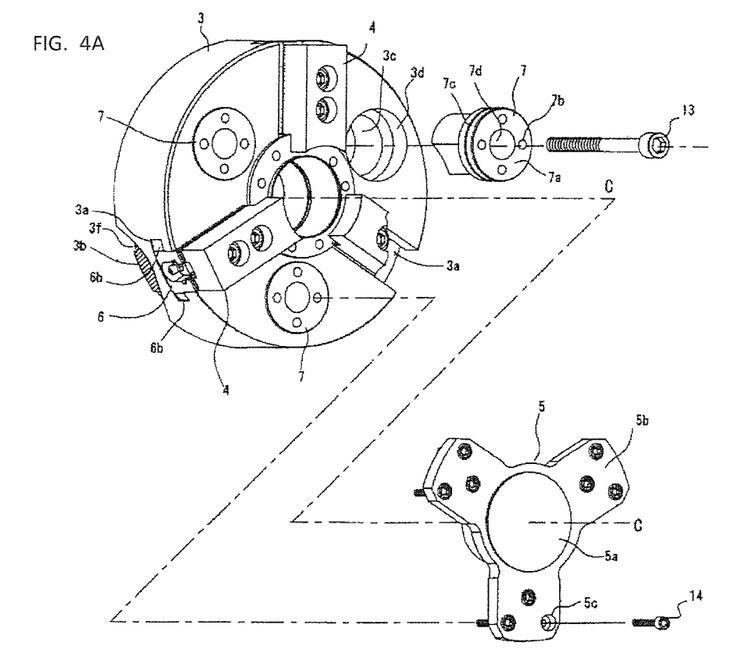
Figure 4B:
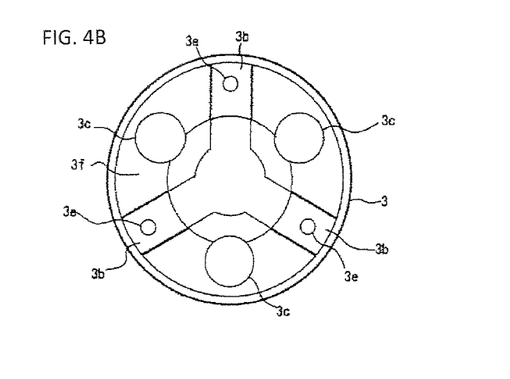
FIG. 4B is a rear view of a moving body 3.

FIGS. 4A and 4B shows the moving body 3, the master jaws 6, the jaws 4, the face-blocks 7 and the jig 5, and FIG. 4A is a perspective view. Besides, FIG. 4B is a rear view of the moving body 3. Three through holes 3c of the same number as the jaws 4 are formed in the moving body 3 at equal angular intervals, and a wall surface 3d of the front side (to the right in FIG. 4A) of each through holes 3c is formed as a sliding surface for sliding the moving body 3 in the Z direction by opening a minute clearance between an outer peripheral surface 7c of each face-block 7. Bolt holes 7b for installing the jig 5 are provided on the reference surface 7a of the face-block 7. In addition, a central through hole 7d accommodates a bolt 13 for fixing the face-block 7 directly to a spindle of an unillustrated machining tool or to a back plate fixed on the spindle. A Y-shaped jig 5 has three arms 5b spaced at equal angular intervals and a closed contact seat 5a at the center. Each of the arms 5b has a plurality of through holes 5c, and is fixed on the reference surface 7a of the face-block 7 by the bolts 14.

Three seats 3b (the second seats) of the same number as the three jaws 4 are provided on the rear face of the moving body 3 at equal angular intervals (FIG. 4A shows one seat 3b as a partial sectional view). The seats 3b are provided at three portions of the same number and orientation as the seats 2a of the rear body 2 (three is the same number as the master jaws 6) to the rearward of the master jaws 6. The seats 3b project to the rearward side (the left direction in FIG. 4A) in comparison with other portion 3f on the same circumference. This is so that the plate spring 11 of the flat shape cannot be interfered at the portion except for the seats 3b. Holes 3e in which bolts 16 (the second bolts) are fastened through the through holes 11a of the plate spring 11 are provided on the seats 3b.

Referring to FIG. 1 and FIG. 2, the plate spring 11 is fastened to the seats 3b of the moving body 3 with the bolts 16 at the positions of the through holes 11a by inserting the bolts 16 into the through holes 11a. The plate spring 11 is fastened to the unillustrated machining tool or the seats 2a of the rear body 2 by the bolts 12 or the bolts 13 at the positions of the through holes 11c, 11d at both sides of the through hole 11a by inserting the bolts 12 into the through holes 11d or inserting the bolts 13 into the through holes 11c. Further, the face-blocks 7 are fastened to the seats 2a by the bolts 13. The face-block 7 can provide reference surface 7a having a high accuracy to the jig 5 because the face-block 7 is connected to the spindle of the machining tool by a rigid structure without having swinging portions in the middle.

Because the plate spring 11 has a ring shape (see FIG. 2), the rear body 2 and the moving body 3 are fixed on the circumference of the plate spring 11 alternately in order of the rear body 2 and the moving body 3. Thus, the plate spring 11 is disposed in a bridging manner between the seats 2a installed with intervals, and fastened to the seats 2a by the bolts 13, respectively. The plate spring 11 is fastened to the seats 3b of the moving body 3 with the bolts 16 between the adjacent seats 2a.

The chuck 100 has three jaws 4, and therefore, the plate spring 11 of the moving body 3 side should be fixed at three positions of the same number as the jaws 4, and the strength of the plate spring 11 can be enhanced. For example, in case of the chuck having two jaws, the plate spring 11 is fixed at two positions, and in case of the chuck having four jaws 4, the plate spring 11 is fastened at four positions.

In describing the fixing state with reference to FIG. 1, the rear body 2 is fastened to the spindle or the back plate by the bolts 13 (so as to sandwich the face-block 7). The plate spring 11 is fastened by the bolts 12 so as to be sandwiched between the rear body 2 and the face-block 7. The moving body 3 is fastened to the plate spring 11 by the bolts 16. Therefore, the moving body 3 is fixed to the spindle indirectly. Because the plate spring 11 is fastened by each of the bolts 13, 12 and 16, it has a high rigidity around the rotational axis C and is elastically deformed only relative to the Z direction, and therefore, the moving body 3 is allowed to move only forward and backward (or "longitudinally") relative to the rear body 2.

Next, the action of the chuck 100 will be described. When grasping the workpiece, first of all, the workpiece is contacted on the closed contact seat 5a. The plunger 8 is moved rearward in the Z direction by driving the cylinder 17. The master jaws 6 are connected to the plunger 8 through the wedge portions 8a, and therefore, the rearward movement in the Z direction of the plunger 8 is added on the master jaws 6.

When the plunger 8 moves further rearward in the Z direction, the master jaws 6 move in the radial direction toward the central axis of the rotation axis C due to the wedge action of the wedge portions 8a and come to be in contact with the workpiece. Though the workpiece is grasped loosely by the elasticity of the plate spring 11, the plate spring 11 has the high rigidity around the rotation axis C and allows the moving body 3 to move only in the Z direction, and therefore, the grasp accuracy can be maintained in a high state.

Though the plate spring 11 is further displaced, a bending deformation occurs only in the Z direction. The workpiece contacting the closed contact seat 5a is pressed to the closed contact seat 5a by the jaws 4, and adhered to the closed contact seat 5a by the elasticity of the plate spring 11 even if the workpiece is inclined. Then, the workpiece is grasped finally by further enhancing the grasping force of the jaws 4. In this case, when an additional driving force F is applied on the cylinder 7 to move the plunger 8 backward, the master jaws 6 are pulled in by the plunger 8 and the seats 3b of the moving body 3 are displaced in the Z direction. Thus, though the bending force is applied on the plate spring 11, the plate spring 11 is flexible in the axial direction because the plate spring 11 is thin and the axial rigidity is lowered. However, because the thickness of the plate spring 11 has no effects on the rotation direction of the rotation axis C and the radial direction, the plate spring 11 is hard to be displaced. Therefore, though the axial direction is displaced, the other directions are fixed with the high rigidity.

Figure 5A:
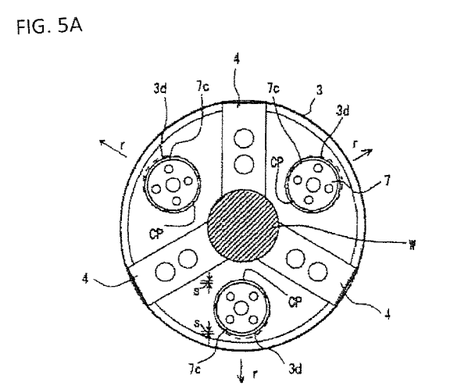
FIG. 5A is a view seen from the front of a chuck 100.
Figure 5B:
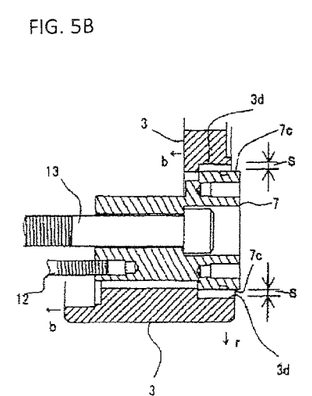
FIG. 5B and FIG. 5C show a partial cross section of the moving body 3 and a face-block 7, respectively.
Figure 5C:
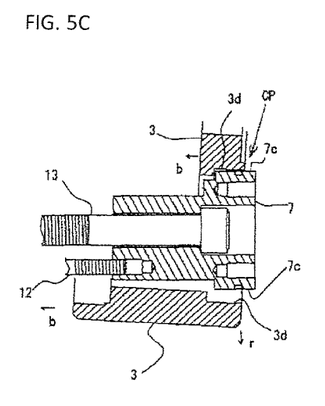

FIGS. 5A to 5C show a state that the workpiece is contacted, and thereafter, the plunger 8 is further displaced backward in the Z direction and the workpiece is finally grasped. FIG. 5A is a figure of the chuck 100 viewed from the front (the workpiece W is shown as a section), and FIG. 5B and FIG. 5C show partial cross sections of the moving body 3 and the face-block 7, respectively. Besides, in FIG. 5B and FIG. 5C, a micro clearance s between the moving body 3 and the face-block 7 is drawn extremely larger in order to easily understand the movements of the moving body 3 and the face-block 7. The face-block 7 slides on the wall surface 3d of each through hole 3c provided on the surface side of the moving body 3. According to this sliding, the moving body 3 is movable in the axial direction, while movements in other directions are regulated. With regard to the micro clearance s between the wall surface 3d of the moving body 3 and the outer peripheral surface 7c of the face-block 7, when the jaws 4 grasp the workpiece, the slot 3a of the moving body 3 receives a moment load from the master jaws 6, and the through holes 3c of the moving body 3 are elastically deformed radially outward to contact the face-blocks 7 (FIG. 5A). The face-blocks 7 at three portions on the periphery are contacted, and the moving body 3 is fixed on the face-blocks 7. In addition, it is further expected that the rigidity of each face-block 7 is enhanced by fixing the jig 5 with three arms 5b on the reference surfaces 7a of three face-blocks 7 as shown in FIG. 1.

Further, though this example shows the chuck for displacing the master jaws 6 through the wedge action, the present invention is applicable to different chucks for displacing the master jaws through another aspect. For example, it is applicable to a lever type chuck referred to Japanese Unexamined Patent Publication No. 6-277910.

Furthermore, the present invention is applicable to a chuck for driving the master jaws 6 without directly engaging with the plunger 8 through another member such as a wedge-shaped boosting mechanism between the master jaws 6 and the plunger 8.

Example 2

In the description of the example 1, relation between the slider 22 and the plate spring 11 was not explained because the slider 22 was not required as an explanation of the example. The example 2 describes an example in which the slider 22 is used by changing a spring constant of the plate spring 11 arbitrarily.

Figure 6:
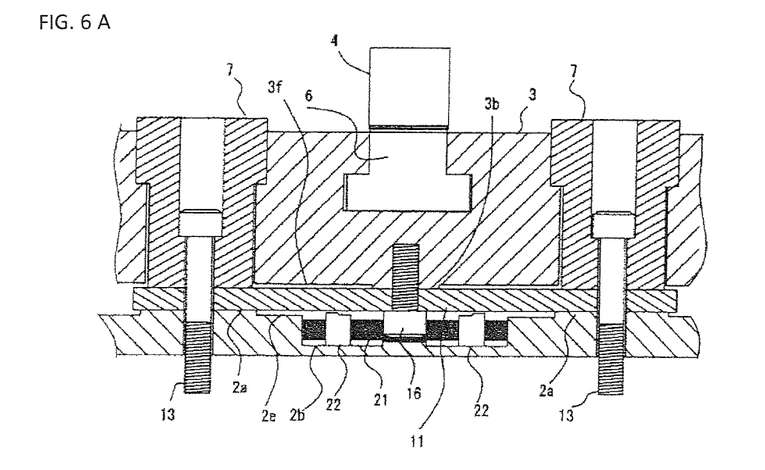
FIG. 6A shows an example of a scenario having two sliders 22 and FIG. 6B shows an example of a scenario having one slider 22.

FIGS. 6A and 6B show a section taken on line X-X in FIG. 1. The section taken on line X-X is a figure viewed from the outer periphery side of the rear body 2 by cutting along the groove 2b. FIG. 6A shows a case having two sliders 22, and FIG. 6B shows a case having one slider 22.

In FIG. 6A, a screw rod 21 is installed in the groove 2b in the longitudinal direction. The screw rod 21 has a screwed direction changed in the middle, and one side is a right-handed screw and the other side is a left-handed screw. The sliders 22 are screwed onto both sides of the screw rod 21, namely, the slider 22 having the right-handed screw is screwed on the screw rod 21 having the right-handed screw, and the slider 22 having the left-handed screw is screwed on the screw rod 21 having the left-handed screw. The sliders 22 are brought close to each other or separated from each other by rotating the screw rod 21.

The plate spring 11 supports a load from one seat 3b between the adjacent seats 2a. When a force for moving the moving body 3 in the Z direction is added by the driving force F of the cylinder 17, the plate spring 11 is deformed in the space of the recessed portion 2e. When the plate spring 11 is displaced to the Z direction, the plate spring 11 comes to be in contact with the sliders 22. There is a clearance of about 0.01 to 0.2 mm between the plate spring 11 and each slider 22 at an unloaded condition. It is possible to change a spring constant when the plate spring 11 contacts the sliders 22 arbitrarily by bringing the sliders 22 close to each other or separating them from each other by rotating the screw rod 21. Besides, the rear face sides of the sliders 22 contact the rear body 2 to transfer compression force from the plate spring 11 to the rear body 2.

Figure 7A:
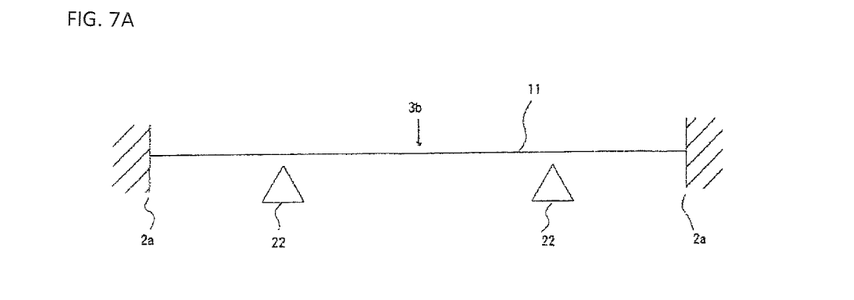
FIG. 7A shows a no-load state.
Figure 7B:
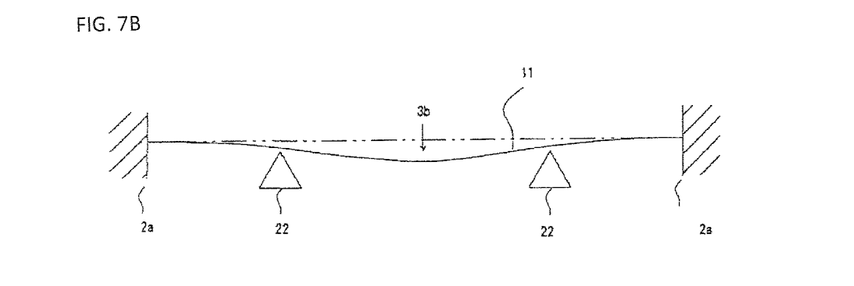
FIG. 7B shows a state that the sliders do not contact the plate spring.
Figure 7C:
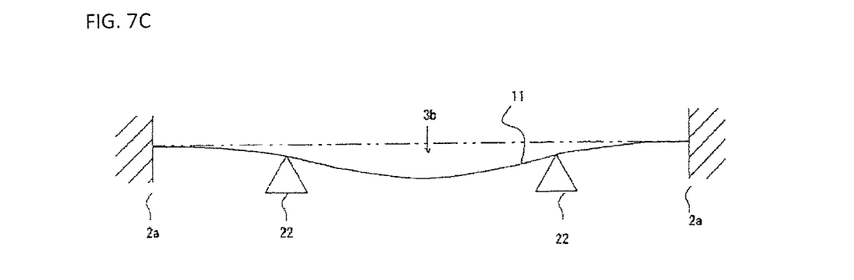
FIG. 7C shows a state that the sliders contact the plate spring.

FIGS. 7A to 7C schematically show displacement states of the plate spring 11. FIG. 7A shows a no-loading state, FIG. 7B shows a state that the sliders 22 are not in contact with the plate spring 11, and FIG. 7C shows a state that the sliders 22 are in contact with the plate spring 11. In an example of how to use, when contacting the workpiece to the closed contact seat 5a,—first of all, a condition shown in FIG. 7B is utilized. The plate spring 11 exhibits resistance by using the total length of the distance between the seat 2a and the seat 3a. When the jaws 4 increase the grasping force, the plate spring 11 disposed in a bridging manner between the adjacent seats 2a comes to be in contact with the sliders 22 in a procedure of deformation. Because the rear body 2 backs up to the rear of the sliders 22, the deformation length of the plate spring 11 is changed by changing the distance between sliders 22. The resistance of plate spring 11 is changed by varying the distance between the slider 22 and the slider 22.

In making the spring constant smaller, even for the driving force of the same cylinder 17, the distance that the moving body 3 is displaced in the Z direction becomes larger. Therefore, a force that the jaws 4 press the workpiece on the closed contact seat 5a becomes larger. In making the spring constant larger, the pressing force becomes smaller. In making the pressing force larger, the workpiece is firmly fixed. In making the pressing force smaller, the occurrence of strain in the workpiece can be prevented. These adjustments are made in accordance with the machining of the workpiece.

Returning to FIGS. 6A and 6B, in FIG. 6B, the screw rod 21 has a length of about one half of the length in FIG. 6A, one screw rod 21 is engaged without changing the screwed direction in the middle. The sliders 22 are brought close to each other or separated from each other by rotating the screw rod 21.

Because the sliders 22 are brought close to each other or separated from each other by rotating the screw rod 21, the length of the plate spring 11 between the slider 22 and the seat 2a is changed. Accordingly, on the basis of the principles shown in FIG. 7, the spring constant when the plate spring 11 contacts the sliders 22 can be changed arbitrarily and the pressing force can be adjusted according to the positions of the sliders 22.

Example 3

FIGS. 8A to 8D shows a chuck 300 of the example 3. The same features as those in the example 1 and the example 2 are denoted by the same reference designations. In the example 2, the spring constant of the plate spring 11 is changed by changing the positions of the sliders 22 by rotating the screw rod 21 from the outer peripheral surface of the rear body 2. In the example 3, the spring constant is changed by changing the positions of sliders 51b by operating adjusters 51 from the front side of the moving body 3 (the right side of FIG. 8A).

Figures 8A, 8B:
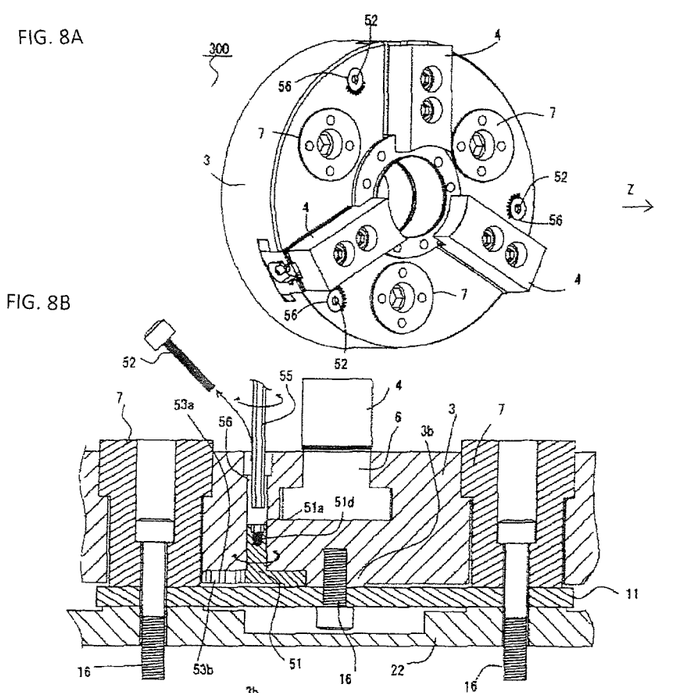
FIG. 8A is a perspective view.
FIG. 8B is a cross-sectional view.
Figure 8C:
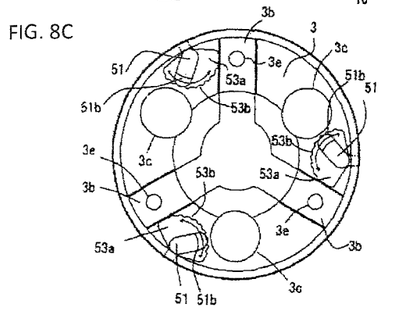
FIG. 8C is a rear view of the moving body.
Figure 8D:
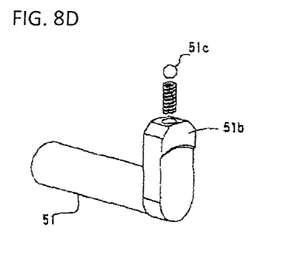
FIG. 8D is a perspective view of an adjusting element.

In FIG. 8A, the front side of the moving body 3 is provided with a plurality of maintenance holes 56 (three holes in this example) at equal angular intervals. In general, the maintenance holes 56 are in a sealing state in which sealing bolts 52 are screwed into female screw holes 51d of the adjusters 51. In FIG. 8B, in taking out the sealing bolt 52 from each maintenance hole 56, an operation terminal 51a of each adjuster 51 is visible. The sealing bolts 52 are meant to prevent cutting chips from entering. Each operation terminal 51a is a female groove for receiving a hexagonal wrench 55 to rotate the adjuster 51 positioned between the moving body 3 and the plate spring 11. A female screw hole 51d is provided to the deep side of each operation terminal 51a. Each adjuster 51 penetrates through the moving body 3 and confronts to the plate spring 11. The adjuster 51, as shown in FIG. 8D, has a slider 51b to the side confronting to the plate spring 11, and the slider 51b comes to be in contact with the plate spring 11 in the process by which the plate spring 11 is transformed. Recesses 53a are provided on the side of the moving body 3 to swing the sliders 51b. In rotating the adjusters 51, positions which the sliders 51b contacts the plate spring 11 are changed, thereby changing the spring constant of the plate spring 11. Besides, the rear sides of the sliders 51b contact the moving body 3, thereby transferring the pressing force from the plate spring 11 to the moving body 3.

Latching notches 53b are provided to the sides of the recesses 53a at equal angular intervals and a pawl 51c elastically reciprocating to a latching notch 53b is provided to the side of the adjuster 51 so that the rotation angle of the adjuster 51 is easily changed discretely. The fixing of the adjusters 51 is performed by fastening the sealing bolts 52 after adjusting the rotation angle of each adjuster 51 by the hexagonal wrench 55. Besides, though the fixing of the adjusters 51 is performed by fastening the sealing bolts 52 in the above-mentioned example, it may be fixed by screwing a bolt in a female screw hole that passes from the side face of the moving body 3 to the side face of each adjuster 51 as another example.

According to the example 3, the spring constant of the plate spring 11 can be changed by changing the positions of the sliders 51b from the front side of the moving body 3 that is often seen in most of machine tools. In addition, the number of components can be reduced and cost can be reduced more than the case where the screw bar 21 and the slider 22 are provided to the rear body 2 like the example 2.

EXPLANATION OF REFERENCED NUMERALS 1 body
2 rear body
3 moving body
4 jaw
5 jig
6 master jaw
7 face-block
8 plunger
9 container
10 spring
11 plate spring
12, 13, 14, 16 bolt 17 cylinder
21 screw bar
22, 51b slider
51 adjuster
100, 300 chuck

The invention claimed is:

1. A retracting chuck comprising:
a body comprising a rear body disposed on an axial rear side and a moving body disposed on an axial front side;
a plunger configured to be moveable axially in the body; and
a master jaw configured to be moveable in a radial direction in response to movement of the plunger while being guided by the body,
wherein the moving body is configured to be moveable axially relative to the rear body,
wherein the rear body is so constructed that a plate spring is disposed to extend between first seats provided at a distance from each other on the rear body, and that the plate spring is fastened by first bolts to each of the first seats, and
wherein the moving body is so constructed that the plate spring is fastened between the first seats and second seats provided in a rear face of the moving body by second bolts.

2. The retracting chuck according to claim 1,
wherein the rear body has the first seats at equal angular intervals, wherein the moving body has a same number of the second seats as the first seats on the rear face, and
wherein the plate spring is formed into a ring shape, and on a circumference around the plate spring, fastened to the first seats and the second seats alternately by the first bolts or the second bolts.

3. The retracting chuck according to claim 2, further comprising:
face-blocks for projecting reference faces to a front side of the moving body from through holes provided in the moving body,
wherein the face-blocks are fastened to the first seats by the first bolts, and
wherein side faces of the face-blocks and the through holes of the moving body are so constructed that the moving body is slidable axially.

4. The retracting chuck according to claim 1, further comprising;
at least one slider for changing a deforming length of the plate spring,
wherein the at least one slider contacts the plate spring between the adjacent first seats in a process of deforming, and
wherein the at least one slider is so arranged that the position of the at least one slider is changeable between the plate spring and the rear body.

5. The retracting chuck according to claim 1, further comprising;
sliders for changing a deforming length of the plate spring,
wherein the sliders contact the plate spring between the adjacent first seats in a process of deforming, and
wherein the sliders are so arranged that the position of the sliders are changeable between the plate spring and the moving body.

6. The retracting chuck according to claim 5,
wherein the moving body has maintenance holes opened on the front face side, and the positions of the sliders are changeable through respective one of the maintenance holes.

7. The retracting chuck according to claim 6,
wherein sealing bolts close the maintenance holes, and the positions of the sliders are changeable through the maintenance holes after the sealing bolts are removed from the maintenance holes.

* * * * *